US010580449B2

(12) United States Patent
Wang

(10) Patent No.: US 10,580,449 B2
(45) Date of Patent: Mar. 3, 2020

(54) OPTICAL STORAGE SYSTEM DIVIDER BASED DRAW VERIFICATION WITH HIGH FREQUENCY WRITING STRATEGY PATTERN

(71) Applicant: Oracle International Corporation, Redwood Shores, CA (US)

(72) Inventor: Lingtao Wang, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/241,534

(22) Filed: Jan. 7, 2019

(65) Prior Publication Data

US 2019/0139570 A1 May 9, 2019

Related U.S. Application Data

(63) Continuation of application No. 15/355,891, filed on Nov. 18, 2016, now Pat. No. 10,176,837.

(51) Int. Cl.
*G11B 7/0045* (2006.01)
*G11B 20/18* (2006.01)
(Continued)

(52) U.S. Cl.
CPC .......... *G11B 7/00458* (2013.01); *G11B 7/003* (2013.01); *G11B 7/0062* (2013.01); (Continued)

(58) Field of Classification Search
None
See application file for complete search history.

(56) References Cited

U.S. PATENT DOCUMENTS 4,415,938 A 11/1983 Heitmann
4,488,277 A 12/1984 McFarlane et al.
(Continued)

FOREIGN PATENT DOCUMENTS

EP 0087174 A1 8/1983
EP 0731455 A2 9/1996
(Continued)

OTHER PUBLICATIONS

Optical head Design for 1TB Optical Tape Drive, Mandad Manavi et al., LOTS Technology, Inc., May 2000.
(Continued)

*Primary Examiner* — Brian M Butcher
(74) *Attorney, Agent, or Firm* — Invoke

(57) ABSTRACT

An optical storage system includes an optical head configured to split a light beam into a higher power main beam and at least one lower power side beam. The optical storage system also includes a controller configured to alter an optical medium, via modulation of the higher power main beam according to a writing strategy waveform that defines at least n pulses for every n bits of data to be written to the medium, while processing a first signal resulting from the at least one lower power side beam being reflected from the medium and a second signal indicative of the writing strategy waveform to remove noise from the first signal caused by the higher power main beam to generate output indicative of the data directly after writing.

17 Claims, 6 Drawing Sheets

(51) Int. Cl.

| | |
|---|---|
| ***G11B 19/04*** | (2006.01) |
| ***G11B 7/006*** | (2006.01) |
| ***G11B 7/003*** | (2006.01) |
| ***G11B 7/1263*** | (2012.01) |
| ***G11B 7/128*** | (2012.01) |
| ***G11B 7/1395*** | (2012.01) |
| *G11B 7/24* | (2013.01) |
| *G11B 7/1353* | (2012.01) |

(52) U.S. Cl.

CPC ............ *G11B 7/128* (2013.01); *G11B 7/1263* (2013.01); *G11B 7/1395* (2013.01); *G11B 19/041* (2013.01); *G11B 20/1879* (2013.01); *G11B 7/1353* (2013.01); *G11B 2007/240017* (2013.01)

(56) References Cited

U.S. PATENT DOCUMENTS

| | | | |
|---|---|---|---|
| 4,980,878 | A | 12/1990 | Szerlip |
| 5,105,413 | A | 4/1992 | Bakx |
| 5,130,965 | A | 7/1992 | Karaki et al. |
| 5,267,226 | A | 11/1993 | Matsuoka et al. |
| 5,708,639 | A | 1/1998 | Iwanaga |
| 5,808,991 | A | 9/1998 | Inoue |
| 5,909,418 | A | 6/1999 | Noda et al. |
| 6,141,312 | A | 10/2000 | Masters et al. |
| 2005/0041552 | A1* | 2/2005 | Shoji .................. G11B 7/00456 369/59.12 |
| 2006/0269717 | A1 | 11/2006 | Miura et al. |
| 2008/0212453 | A1* | 9/2008 | Miyazawa ......... G11B 7/00455 369/116 |
| 2008/0225656 | A1 | 9/2008 | Stallinga et al. |
| 2009/0022024 | A1 | 1/2009 | Hayashi |
| 2011/0103202 | A1 | 5/2011 | Ichikawa |
| 2011/0141863 | A1 | 6/2011 | Mahnad |
| 2013/0051203 | A1 | 2/2013 | Mahnad |
| 2013/0083641 | A1 | 4/2013 | Kobayashi et al. |
| 2016/0035383 | A1* | 2/2016 | Tagami .................... G11B 5/09 369/13.26 |

FOREIGN PATENT DOCUMENTS

| | | | |
|---|---|---|---|
| EP | 0860827 | A2 | 8/1998 |
| EP | 1610304 | A2 | 12/2005 |
| JP | 63-166025 | A | 7/1988 |
| JP | 05-073913 | A | 3/1993 |

OTHER PUBLICATIONS

MicroContinuum: Technology: Data Storage, “Optical Tape—A new Way to Archive Data”, Copyright 2008.

* cited by examiner

OPTICAL STORAGE SYSTEM DIVIDER BASED DRAW VERIFICATION WITH HIGH FREQUENCY WRITING STRATEGY PATTERN

INCORPORATION BY REFERENCE; DISCLAIMER

The following application is hereby incorporated by reference: application Ser. No. 15/355,891 filed on Nov. 18, 2016. The Applicant hereby rescinds any disclaimer of claim scope in the parent application or the prosecution history thereof and advises the USPTO that the claims in this application may be broader than any claim in the parent application.

TECHNICAL FIELD

This disclosure relates to techniques for real-time verification of written data in an optical storage system.

BACKGROUND

Optical recording devices such as optical disk and optical tape drives commonly use an Optical Pickup Unit (OPU) or read/write head to write and retrieve data from associated optical media. Conventional OPUs may utilize different wavelength semiconductor laser diodes with complex beam path optics and electromechanical elements to focus and track the optical beam within one or more preformatted tracks on the medium to write or store the data and subsequently read the data. Data written to the medium with a laser at higher power may be verified in a separate operation or process after writing using a lower laser power, or may be verified during the write operation by another laser or laser beam. The ability to read and verify the data during the write operation may be referred to as Direct Read After Write (DRAW).

Current OPUs may use a diffraction grating or similar optics in the laser path to generate three beams from a single laser element including a higher power beam used for reading/writing data and for focusing, and two lower power satellite beams used for tracking. The three beams are focused to three corresponding spots on the surface of the optical storage medium used by the various optical and electromechanical elements of the OPU. In general, the higher power spot is positioned in the center or middle between the two satellite spots. In addition to reading/writing data and focusing, the center spot may also be used for one particular type of tracking operation in some applications. The lower power satellite spots generated from the lower power side beams are typically used for another type of tracking operation for specific types of media.

SUMMARY

Optical storage systems and methods of performing direct read after write for the same utilize circuitry and/or controllers configured to process data read directly after writing to remove noise introduced by the writing. Because the writing process involves high-frequency writing strategy pulses in the laser's optical power for creating the crystal phase change on the optical recording layer of the media, the direct read laser power signal from the laser light sensor during the write contains modulation of the written data and the high-frequency writing pulses. Although division of the read signal by the writing strategy signal, for example, can cancel out the noise to recover and verify the written data, the number of pulses used to write a given number of bits has been found to impact the quality of the verification mentioned above.

In one embodiment, an optical storage system includes an optical head and controller arrangement that modulates a higher power main beam according to a writing strategy waveform that defines at least one pulse for each bit to be written to an optical medium, reads, directly after writing, feedback from the medium containing written data and noise resulting from the higher power main beam, removes the noise from the feedback by dividing the feedback with data indicative of the writing strategy waveform, and generates output indicative of the written data.

In another embodiment, a method for performing direct read after write on an optical medium includes splitting a light beam into a higher power main beam and at least one lower power side beam, and modulating the higher power main beam according to a writing strategy waveform that defines at least n pulses for every n bits of data to be written to the optical medium. The method also includes, while performing the modulating, processing a first signal resulting from at least one of the lower power side beams being reflected from the medium and a second signal resulting from scatter of the higher power main beam to remove noise from the first signal caused by the higher power main beam, and generating output resulting from the processing indicative of the data.

In yet another embodiment, an optical storage system includes an optical head that splits a light beam into a higher power main beam and at least one lower power side beam, and a controller. The controller alters an optical medium, via modulation of the higher power main beam according to a writing strategy waveform that defines at least n pulses for every n bits of data to be written to the medium, while processing a first signal resulting from the at least one lower power side beam being reflected from the medium and a second signal indicative of the writing strategy waveform to remove noise from the first signal caused by the higher power main beam to generate output indicative of the data directly after writing.

DETAILED DESCRIPTION

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 1A:
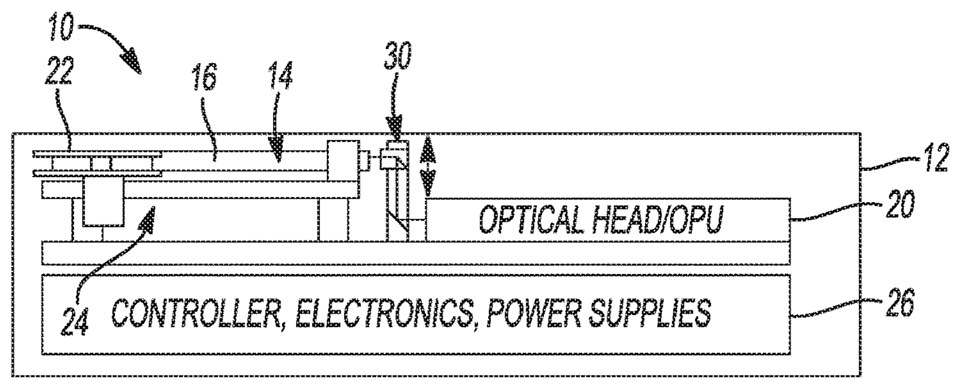
FIGS. 1A and 1B are block diagrams illustrating operation of an example optical data storage system or method with direct read after write (DRAW) capability.
Figure 1B:
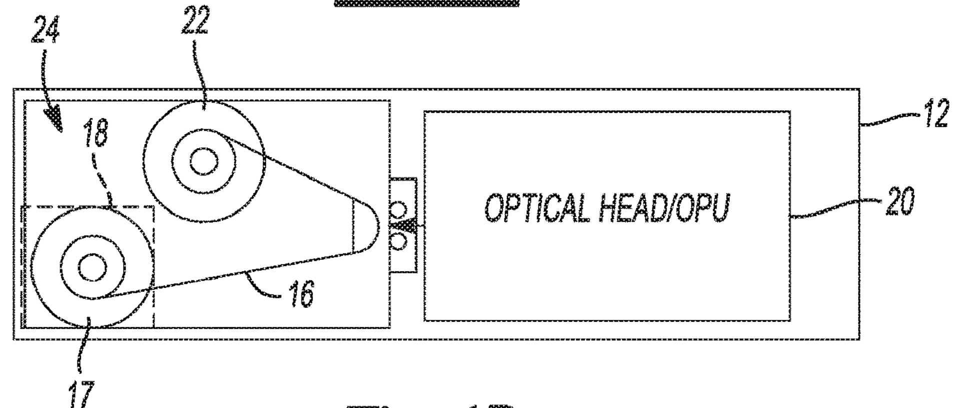

Referring now to FIGS. 1A and 1B, block diagrams illustrating operation of an example optical data storage system or method with direct read after write (DRAW) capability are shown. FIG. 1A is a side view diagram and FIG. 1B is a top or plan view diagram. In this embodiment, optical data storage system 10 is an optical tape drive 12 that receives an optical data storage medium 14, which is an optical tape 16. While illustrated and described with reference to an optical tape drive, those of ordinary skill in the art will recognize that the teachings of the present disclosure may also be applied to various other types of optical data storage devices that may use various types of write-once or re-writable optical media, such as optical discs. The optical tape 16 is a ½ inch (12.7 mm) wide tape having a plurality of tracks 36 generally extending across the width of the tape and may vary in length depending on the desired storage capacity and performance characteristics as illustrated and described in greater detail herein. Other tape configurations and dimensions, however, are also possible. The optical tape 16 may be wound on an associated spool 17 contained within a protective case or cartridge 18 that is manually or automatically loaded or mounted in the optical tape drive 12. Transport mechanism 24 moves the optical tape 16 through a carriage and past at least one optical pickup unit (OPU) or optical head 20 to a take-up spool 22 that typically remains within the tape drive 12. The OPU 20 writes data to, and reads data from, the optical tape 16 as the transport mechanism 24 moves the optical tape 16 between the cartridge 18 and take-up spool 22 in response to at least one controller and associated electronics 26. As explained in greater detail below, data may be read/written to the optical tape 16 in one or more of the tracks 36 in a serpentine fashion as the tape travels in either direction past the OPU 20, i.e., either from the cartridge 18 to the take-up spool 22, or from the take-up spool 22 to the cartridge 18.

The optical head 20 may include associated optics and related electromechanical servo controlled devices, represented generally by reference numeral 30, that split or divide a light beam, such as a laser beam, into two or more beams that are focused to corresponding spots on the storage medium 16 for reading/writing data as illustrated and described in greater detail with reference to FIG. 2. Various servo mechanisms (not specifically illustrated) may be used to position/align the beams with a selected one of the tracks 36 on the optical tape 16.

Figure 2:
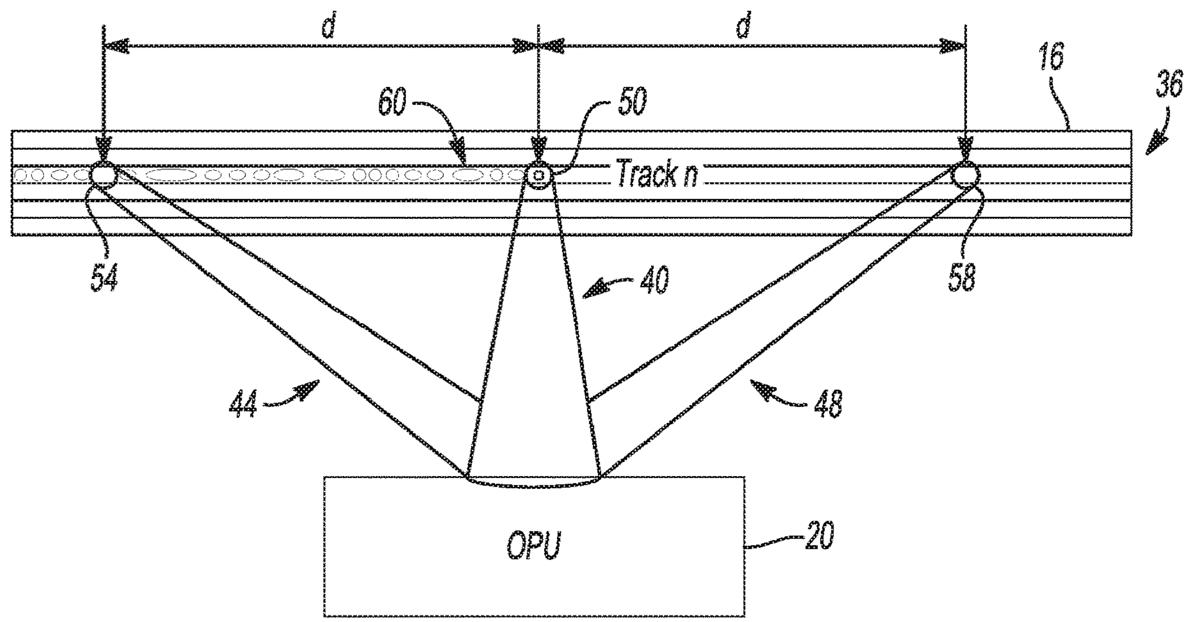
FIG. 2 is a block diagram illustrating operation of the optical pickup unit (OPU) of FIGS. 1A and 1B having a coherent light beam split or divided into a center beam and two satellite or side beams to provide DRAW capability.

FIG. 2 is a block diagram illustrating operation of the optical pickup unit (OPU) 20 having a coherent light beam split or divided into a center beam 40 and two satellite or side beams 44, 48 to provide DRAW capability. The beams 40, 44, 48 may be generated by a single or common coherent light source, such as a laser diode, for example. The source beam travels through associated optics, that may include a diffraction grating, for example, to divide or split the source beam into the center beam 40, first side beam 44, and second side beam 48 and to focus the beams to corresponding spots 50, 54, and 58, respectively, on the surface of the optical tape 16 within a selected one of the tracks 36. The three optical spots 50, 54, and 58 are manipulated by various optical and electrometrical elements of the OPU 20 to write and retrieve data from the optical tape 16.

The optical elements used to split the source beam and focus the resulting beams to the spots 50, 54, and 58 may be designed to provide higher power to the center beam 40 and center spot 50 with lower power to the side beams 44, 48 and associated spots 54, 58. For example, the center beam 40 may contain about 90% of the source beam power with the side beams 44, 48 dividing the remaining 10% of the source beam power. The center beam 40 is modulated by the OPU 20 to generate write marks 60 during writing of data to the optical tape 16, which may require about ten times more average power than to read previously stored data (about 7 mW to write data and about 0.3 mW to read data, for example). As such, if the source beam is modulated and produces sufficient power for writing data using the center beam/spot 40/50, the side beams 44, 48 will be modulated in a like manner but will contain insufficient power to alter the tape 16.

In this embodiment, the spots 50, 54, and 58 are mechanically aligned in the OPU manufacturing process to correspond to the axes of the data tracks 36. In addition, the satellite spots 54, 58 are generally symmetrically positioned relative to the center spot 50 so that transit distance (d) of the tape 16 between the center spot 50 and either of the satellite/side spots 54, 58 is substantially the same. Other embodiments may include a distance (d) of between about 10-20 μm, although other distances are also contemplated.

Certain conventional optical storage devices use the center spot 50 from the higher power emitting beam 40 for reading, writing, and focusing in addition to one type of tracking operation. The satellite spots 54, 58 formed by the lower power side beams 44, 48 are used for another type of tracking for specific types of media. In these applications, the side spots 54, 58 may not be aligned with one another, or with the center spot 50 along a single one of the tracks 36.

As previously described, the source laser beam is operated at a higher power (relative to operation during a data read/retrieval) and modulated to write the data marks 60 on a selected one of the tracks 36 on the optical tape medium 16. However, only the center beam 40 emits enough power to the optical tape 16 to actually alter the structure of the optically active layer. The satellite beams 44, 48, having much lower power as determined by the diffraction grating power distribution, do not alter the tape 16. They, however, have enough power after being reflected from the optical tape 16 to detect the data marks 60. Therefore depending on the direction of travel of the optical tape 16, the reflection from one or both of the associated satellite spots 54, 58 can be detected by the OPU 20 and used to verify the data marks 60 directly after being written by the main beam/spot 40/50 to provide DRAW operation. While the reflected beam associated with one of the satellite beams 44, 48 (depending on the direction of travel of the tape 16) contains information associated with the data marks 60 on the tape medium 16, the reflected beam is heavily contaminated by the modulation of the center beam 40 and other noise sources and generally exhibits a very low signal to noise ratio (SNR).

Some of the DRAW systems and algorithms contemplated use a demodulation/division method to verify written data during the write operation in real-time. For example during the write operation, the written data is decoded (read) from a reflected laser light signal by a high frequency demodulation circuit (divider circuit). Then, the signal quality of the decoded written data can be calculated by a Bit-Error-Rate (BER) detector in order to verify the written data. As a result, the time between data writing and data decoding in this example is less than 1 msec.

As mentioned above, data written by the main spot 50 could be read back by one of the satellite spots 54, 58 after a few micro seconds. The satellite spots 54, 58, however, only have a fraction of the light intensity of the main spot 50. Thus, the light intensity signal detected by either one of the satellite spots 54, 58 is modulated (distorted) with high-frequency laser pulses used for writing. In order to better decode the written data, the satellite spot reflected laser light intensity signal (referred to as the RF signal) can be demodulated from the main spot writing laser pulse signal (referred to as the FM signal as it can be measured by a laser light front monitor detector) using, for example, a DRAW demodulation circuit in order to reverse the modulation caused by the writing pulsation of the laser diode. Also, frequency responses of the RF signal and FM signal can be matched by applying a matched filter before the demodulation. A filter and high-frequency demodulator, therefore, can be designed for decoding and verifying written data during the write operation. Thus, the demodulation and verification of written data can be in real-time.

Figure 3A:
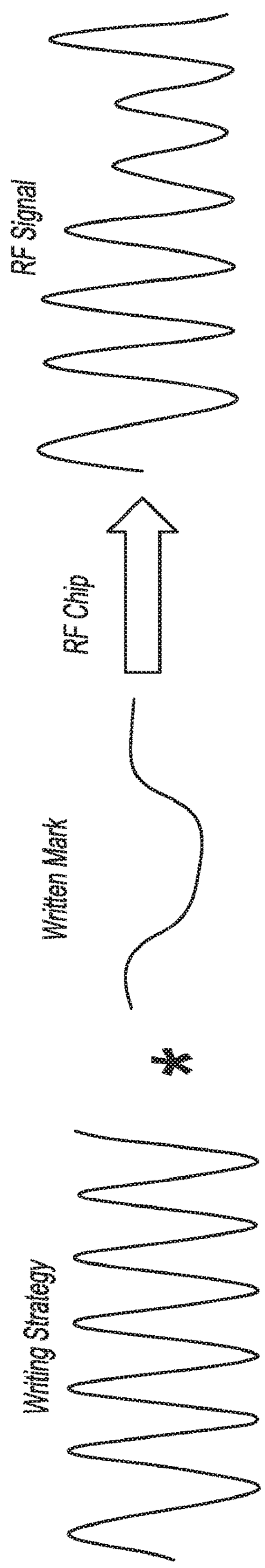
FIGS. 3A through 3C are diagrams illustrating components associated with RF and FM signal wave forms, and the result of their division.
Figure 3B:
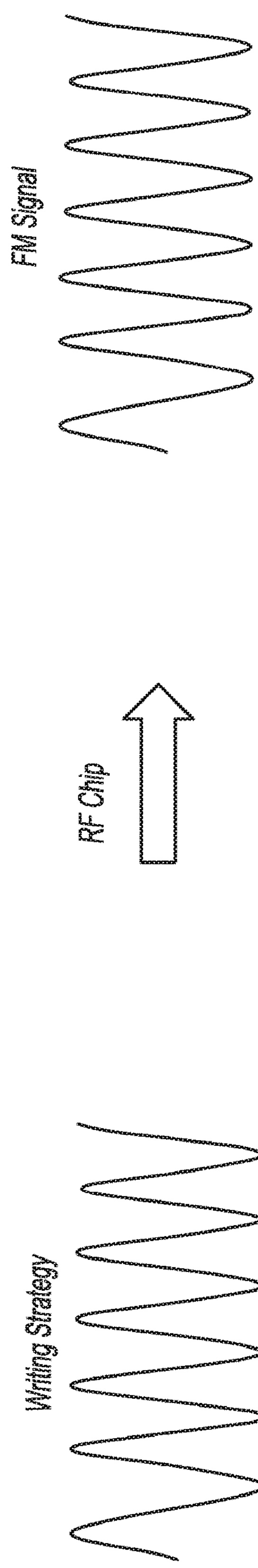
Figure 3C:
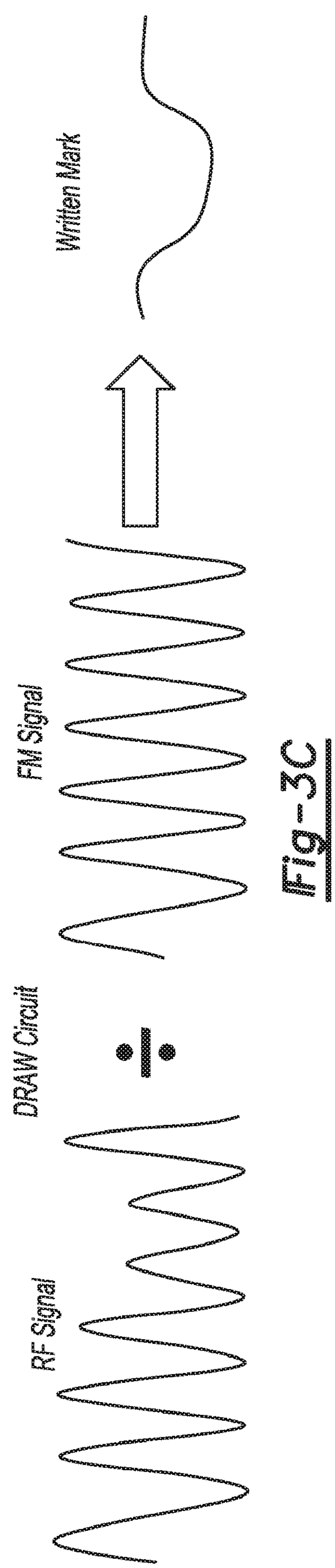

FIG. 3A shows that the RF signal detected by a corresponding RF chip (e.g., a photodetector chip, PDIC, placed at the end of the reflected optical light path of the OPU 20) not only contains data associated with the written mark being read but also the writing strategy waveform embodied by the main spot 50 at the time the written mark was being read. That is, the RF signal is subject to noise introduced by the writing strategy waveform. FIG. 3B shows that the FM signal detected by a corresponding FM chip (e.g., a front monitor chip, FMIC, placed at the laser light output path of the OPU 20) from the scatter associated with the center beam 40 is essentially the writing strategy waveform. FIG. 3C shows that the division of the RF signal by the FM signal via a DRAW circuit yields the written mark.

A voltage of the RF signal, $V_{RF}$, can be represented as $$V_{RF}=k_{RF}\times\phi\times R \tag{1}$$

where $k_{RF}$ is a constant associated with the RF chip, φ is the writing strategy modulated light intensity, and R is the changed reflectivity of the medium indicative of a written mark. And, a voltage of the FM signal, $V_{FM}$, can be represented as $$V_{FM}=k_{FM}\times\phi \tag{2}$$

where $k_{FM}$ is a constant associated with the FM chip. Dividing (1) by (2) yields k×R, where k is $k_{RF}/k_{FM}$. Because $k_{RF}$ and $k_{FM}$ are known, R can be obtained free of influence from $V_{FM}$.

Figure 4:
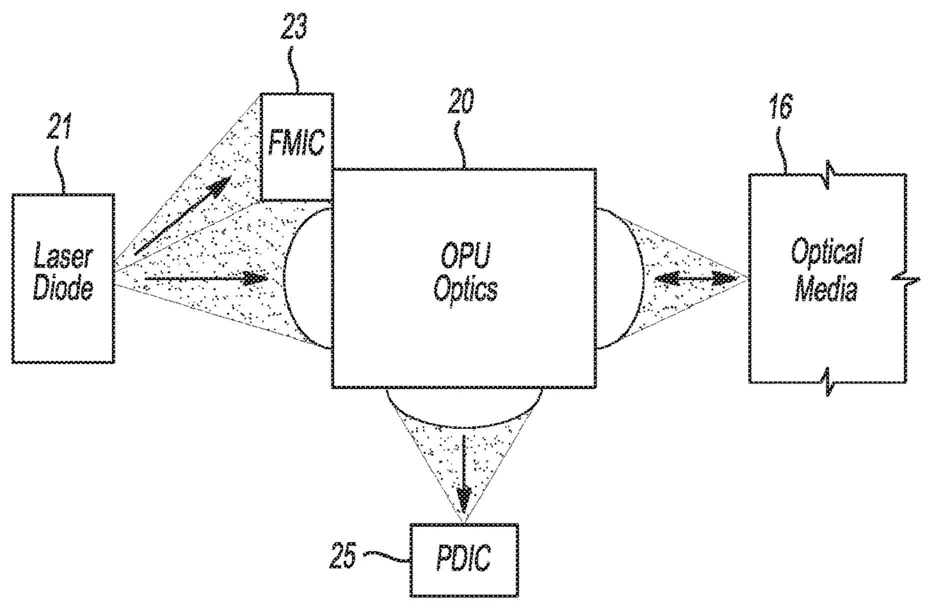
FIG. 4 is another block diagram illustrating operation of the example optical data storage system of FIGS. 1A and 1B.

FIG. 4 shows the OPU 20 and an FMIC chip 23 arranged to receive laser light from a laser diode 21. That is, the FM signal from the FMIC chip 23 represents the direct light output of the laser diode 21 without any modification by the OPU 20 or media 16. And, a PDIC chip 25 is arranged to receive light reflected from the media 16 and through the OPU 20.

Figure 5:
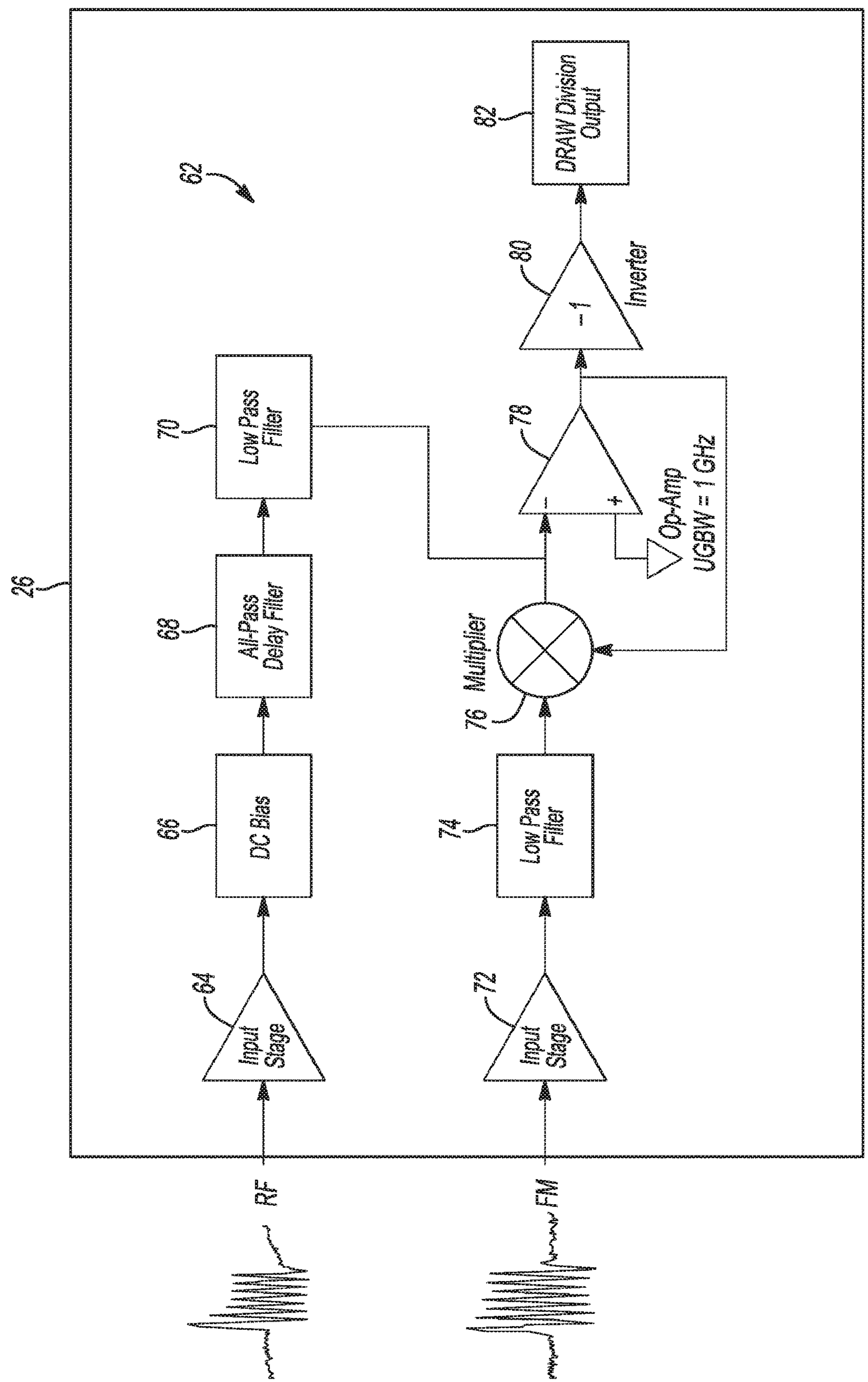
FIG. 5 is a block diagram illustrating an example DRAW demodulation circuit.

FIG. 5 shows the at least one controller and associated electronics 26 implementing an analog DRAW demodulation circuit 62 to perform the signal division described above. In this example, the circuit 62 includes an RF signal input stage 64, a direct current (DC) bias 66, an all-pass delay filter 68, and a low pass filter 70. The circuit 62 also includes an FM signal input stage 72, a low pass filter 74, a multiplier 76, an op-amp 78, an inverter 80, and a DRAW division output 82. The signal process flow associated with the RF signal is the input stage 64 to the DC bias 66, the DC bias 66 to the all-pass delay filter 68, the all-pass delay filter 68 to the low pass filter 70, and the low pass filter 70 to the op-amp 78. The sequence of these elements, however, may be rearranged as necessary. The low pass filter 70, for example, may come before the DC bias 66, etc. The signal process flow associated with the FM signal is the input stage 72 to the low pass filter 74, the low pass filter 74 to the multiplier 76, and the multiplier 76 to the op-amp 78. The final leg of the signal process flow is the op-amp 78 to the multiplier 76 and to the inverter 80, and the inverter 80 to the DRAW division output 82.

FIG. 5 shows but one example of a demodulator or divider arrangement that includes a multiplier, op-amp, and inverter. Any suitable such arrangement, however, may be used. And although the elements of the DRAW demodulation circuit 62 are shown to be implemented in analog form, they of course may be implemented in digital form. In embodiments that implement at least the RF path in digital form, the all-pass delay filter 68 may take the form of a Farrow structure phase delay interpolator, which may allow for finer delay adjustment relative to other delay operations.

To better align the RF and FM signals for division, the DC bias 66 applies a DC bias to the RF signal. In the example of FIG. 5, the bias is +1.3 volts. This value, however, may change depending on design considerations, medium configuration, etc. Also due to the differing frequency responses of the RF and FM chips associated with the OPU 20, the all-pass delay filter 68 applies a delay to the DC biased RF signal for synchronization purposes. In other embodiments, the all-pass delay filter 68 may be in the FM signal path. The frequency associated with the writing strategy can be on the order of 165 megahertz. This value, however, may change with tape speed, writing speed, etc. As such, the low pass filters 70, 74 filter out frequency content associated with the RF and FM signals respectively, in this example, greater than 50 megahertz for better performance in the demodulation stage. This value may also change with tape speed, writing speed, writing strategy pattern, etc. A calibration procedure may be performed to select the appropriate bias and delay values prior to operating at run time.

As mentioned above, the modulation between high-frequency laser pulses and previously written data results in a specific frequency spectrum of RF signal that contains both low and high frequency components. The low frequency components are mainly from previously written data and low frequency components of the writing strategy pulses. The high frequency components are mainly from high frequency components of the writings strategy pulses. Typically a writing strategy pattern is designed with consideration of written data read-back signal quality, but not with demodulated DRAW signal quality. Thus, conventional writing strategies employed in the DRAW techniques described above may experience difficulties in demodulating a DRAW signal from writing strategy pulses due to distortions and interference from the writing strategy pulses. These distortions are due to the overlap of spectrum between the writing strategy and DRAW signal.

Here, certain writing strategies are optimized for both the read-back during read and DRAW signals during write. By examining the frequency spectrum of writing strategy pulses and the mechanism of modulation between the writing strategy and previously written marks during the write, new writing strategies with an optimized number of writing strategy pulses and corresponding pulse widths better separate the writing strategy and DRAW signal spectrums. As such, demodulation of certain DRAW signals is able to achieve the same signal quality as the read-back signal, without unnecessary distortions caused by modulation with writing strategy pulses.

Differences between conventional writing strategies and some of the proposed writing strategies are as follows: (1) Precise writing strategy control could achieve timing resolution within 0.2 ns: The spectrum of writing strategy can be engineered with fine control over the number of pulses as well as the associated pulse widths; (2) The writing strategy spectrum can be engineered to not overlap with the written mark's spectrum located at the low-frequency region in the modulated DRAW's spectrum: The proposed writing strategy pattern makes it possible to demodulate the DRAW signal without distortion caused by writing strategy pulses; (3) The signal qualities of both the read-back signal and DRAW signals can be optimized based on the fine tuning of the timing and location of the writing strategy pulses.

By way of example, when using a conventional writing strategy to write and measure the dSNR of a DRAW signal during the write operation, the DRAW signal experiences about 5 dB SNR loss compared to the read-back signal. This loss is due to the distortion from spectrum interference of the writing strategy pulses. When using an optimized writing strategy with an engineered frequency spectrum for the RF signal however, the distortion loss is eliminated. And, the demodulated DRAW signal has the same signal quality as the read-back signal. (The 5 dB SNR loss is recovered). Hence, the writing strategies contemplated herein do not affect the accuracy of DRAW verifications in real-time. Also because the newly designed writing strategies consider both the demodulation process of DRAW and the writing process, the signal quality of the read-back signal would also be optimized for optical tape media.

Figure 6:
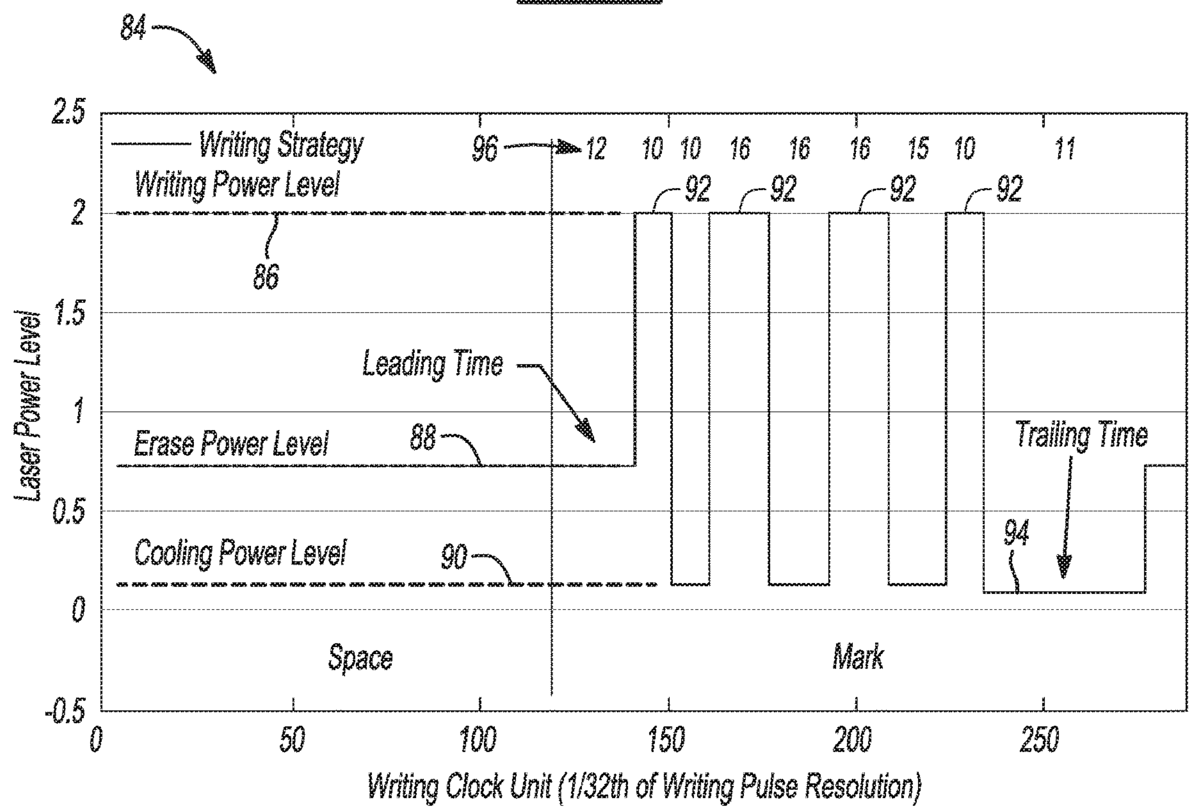
FIG. 6 is a plot of an example 5T space and 4T mark laser pulse writing strategy.

FIG. 6 shows an example 5T space and 4T mark laser pulse writing strategy 84 with corresponding writing power, erase power, and cooling power levels 86, 88, and 90. Pulses 92 are defined by the laser power level in that the erase power level 88 precedes the pulses 92 for a leading time, the pulses 92 achieve the writing power level 86, and the pulses 92 are separated by the cooling power level 90. A trailing time 94 also follows the pulses 92 at a power level less than the cooling power level 90 prior to the next mark. The writing pulse time resolution, in this example, is $\frac{1}{32}$ of a clock cycle. Hence, 32/32 of a clock cycle represents 1 bit data for write, 64/32 of a clock cycle represents 2 bits, etc. Clock cycle timing indicators 96 indicate the time associated with the leading time (12/32), the time associated with the pulses 92 (10/32, 16/32, 16/32, 10/32 respectively), the time associated with the cooling power level 90 between the pulses 92 (10/32, 16/32, 15/32 respectively), and the time associated with the trailing time 94 (11/32). Initial selection and tuning of these times is discussed in further detail below.

As illustrated, 4 writing laser pulses are used to write a 4T mark by using an nT pulse writing strategy. Unlike previous writing strategies that use n−1 pulses to write an nT mark, FIG. 6 is but one example of the proposed strategy to use at least n pulses to write an nT mark (e.g., n pulses, n+1 pulses, . . . , 2n−1 pulses, etc.) This proposed strategy springs from the recognition that the Nyquist-Shannon sampling theorem appears to be implicated when performing divider based DRAW verification. Within this context, each of the n pulses can be thought of as embedding a "sampling point" into the RF signal that represents the writing strategy signal and causes distortion of the RF signal. Writing strategies that use the conventional n−1 pulses to write an nT mark will likely not have sufficient "sampling points" embedded in the RF signal to accurately reflect the shape of the DRAW signal in as far as the Nyquist criterion is concerned. When such an RF signal is demodulated by a corresponding FM signal (essentially the writing strategy pulses), the SNR will be negatively impacted because of the differences between the effectively incomplete DRAW signal embedded in the RF signal and the corresponding FM signal.

Assume that a 2T mark with 2T space is to be conventionally written using a 66 MHz writing clock. The frequency of the read-back 2T signal will be 66 MHz/(2T*2) or 16.5 MHz. According to the Nyquist criterion, such a signal would need to be sampled at 33 MHz (2*16.5 MHz). If only one pulse is used, its frequency would be 33 MHz provided that the pulse width is equally divided into a 16/32-high and a 16/32-low. That is, 1 bit would be sampled in less than 1 clock cycle. Practically speaking however, the pulse width of the writing strategy would be longer than 16/32 for both the high pulse and low pulse in order to achieve the optimal writing process for the best signal quality of the read-back signal. Therefore, the equivalent sampling frequency of the DRAW signal would be less than 33 MHz-resulting in signal distortion. In order to satisfy the Nyquist criterion in the case of 2T DRAW, a writing strategy using n pulses (or more than n pulses) for an nT mark is proposed to improve the dSNR of the DRAW without signal distortion when compared to the read-back signal.

Figure 7:
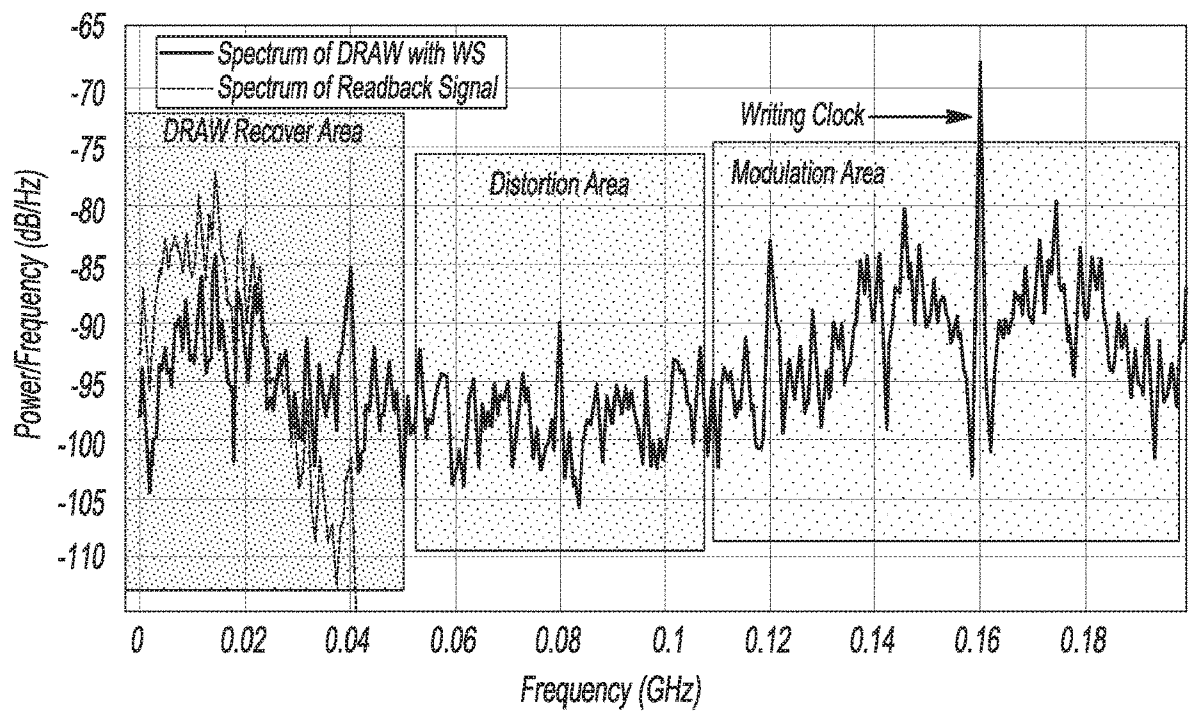
FIG. 7 is a plot of the Welch power spectral density associated with a read-back signal, and an RF signal distorted by a writing strategy signal that uses the coding techniques proposed herein.

To illustrate the effects of the proposed writing strategies, FIG. 7 shows that by using the nT pulse writing strategy the DRAW recover area and the modulation area associated with the writing strategy pulses do not overlap in the spectrum plot of the RF signal during write. Therefore, one is able to separate the DRAW recover area from the distortion area and modulation area by low-pass filtering the signal. And, the DRAW signal could be fully recovered after the demodulation process. In contrast, the distortion area would expand to the DRAW recover area when the n−1 pulses writing strategy is employed. Since it is noted that the 2T frequency locates at the right edge of the DRAW recover area in the spectrum plot of the RF signal during write, the distortion spectrum area would easily overlap with the 2T frequency, and therefore introduce the distortion to the DRAW. Because it is very common for the equalizer in the following read channel to boost the 2T frequency due to the small amplitude of the 2T mark, the distortion would also be boosted due to the spectrum overlap and cause more SNR loss for DRAW-exacerbating the distortion.

Figure 8:
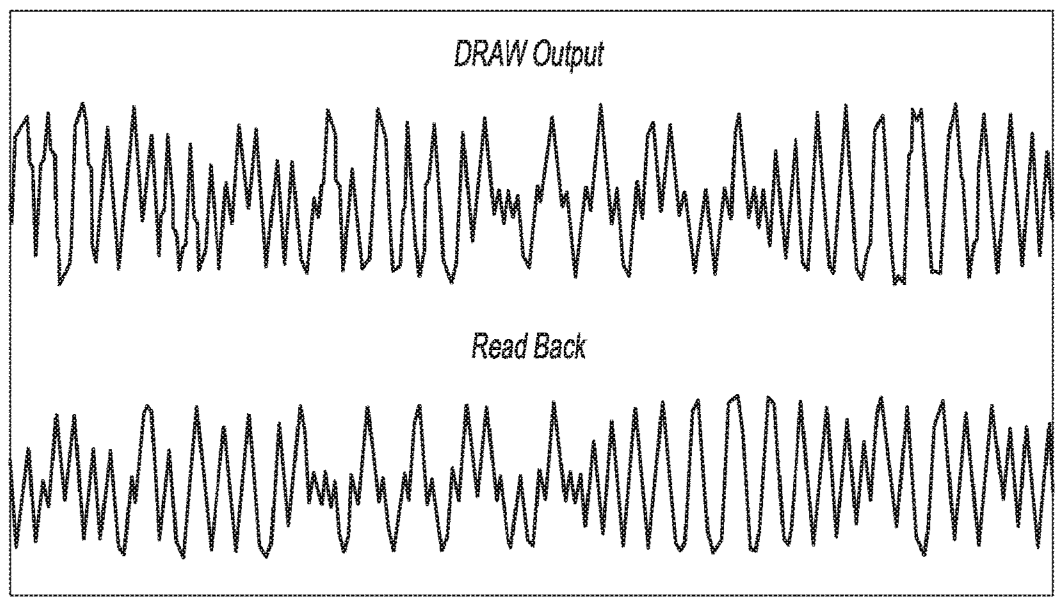
FIG. 8 is a plot comparing, for the same data, a read signal generated during a read operation (bottom waveform) and a DRAW division output signal generated by the DRAW demodulation circuit of FIG. 5 during a write operation (top waveform).

FIG. 8 shows the (phase shifted) similarity between a read signal (bottom waveform) generated during a read operation and, for the same data, a DRAW division output signal (top waveform) generated by the DRAW division output 82 (FIG. 5) during a write operation that uses the nT pulse writing strategy.

Figure 9:
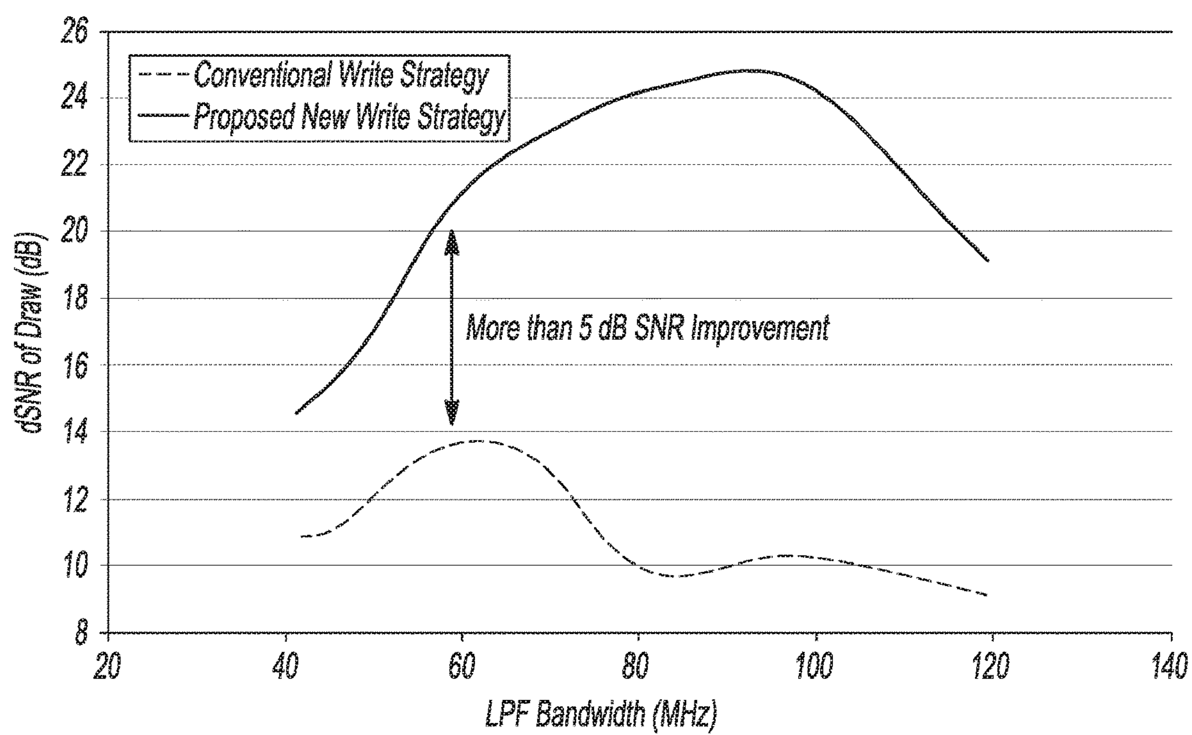
FIG. 9 is a plot comparing signal-to-noise ratio (SNR) performance of the proposed and conventional writing strategies over a number of low pass filter bandwidths.

FIG. 9 shows that the dSNR associated with DRAW verification can exceed 24 dB using the proposed writing strategy. This is significantly higher than that achieved by using the conventional writing strategy. Even at the conventional writing strategy's maximum dSNR, the proposed writing strategy yields an additional 5 dB.

As mentioned above with reference to FIG. 6, the initial selection and tuning of the clock cycle timing indicators 96 can be performed to achieve desired results. Generally speaking, the pulse widths are media dependent and can be determined via testing with design of experiments (DOE). For an nT mark to be written using n pulses (nT pulse WS), a rule of thumb starting point for writing power pulse width is 16/32 and for cooling power level width is 16/32. In the example of FIG. 6, the first and last pulses 92 have been shortened based on read-back signal feedback using known signal quality measurement techniques. For example by comparing a captured read-back signal with an expected wave form, one is able to determine whether the writing process associated with the pulse widths is optimal for both read-back and DRAW. By looking at improvement of dSNR of the read-back and DRAW related to adjustment of the writing strategy pulses and the DC offset of a 2T read-back waveform, one is able to determine if the pulse width of the first and last pulses should be increased or decreased. If the DC offset of the 2T read-back waveform is biased negative compared to the average signal level, this indicates too much energy being deposited on the media. Thus, the first and last pulse widths may be incrementally decreased and then reexamined for performance. If the DC offset is biased positive, this indicates not enough energy being deposited on the media. Thus, the first and last pulse widths may be incrementally increased and then reexamined for dSNR performance as well as the DC offset of the 2T waveform in the read-back signal.

If an amplitude of the read-back signal corresponding to the erase power level portion of the writing strategy is greater than the amplitude of the read-back signal corresponding to the pulsed portion of the writing strategy for all nT read-back waveforms (not just 2T), this unbalanced waveform indicates that not enough energy is being deposited during the write. Thus, the average writing power level may be increased to shift all levels higher. If the opposite conditions are present, then too much energy is being deposited. Thus, the average writing power level may be decreased to shift all levels of the writing strategy pulses lower. (Ideally, the amplitudes should be the same.)

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optical storage system for performing direct read after write on an optical medium, the optical storage system comprising:

an optical head configured to split a light beam into a main beam and at least one side beam; and a controller configured to:

modulate the main beam according to a writing strategy waveform that defines at least n writing pulses rising to a writing power level to write an nT mark to an optical medium, process a first signal resulting from the at least one side beam being reflected from the optical medium, including altering a direct current bias of the first signal, process a second signal indicative of the writing strategy waveform to remove noise from the first signal caused by the main beam, and generate output indicative of the data directly after writing by dividing the first signal by the second signal.

2. The optical storage system of claim 1, wherein the writing strategy waveform defines at least 2n−1 writing pulses rising to a writing power level to write an nT mark to the optical medium.

3. The optical storage system of claim 1, wherein the writing strategy waveform further comprises the laser power level being set to a level lower than a cooling power level subsequent to a final pulse.

4. The optical storage system of claim 1, wherein the writing strategy waveform is such that a frequency of the at least n writing pulses is at least twice a frequency of a first signal.

5. An optical storage system for performing direct read after write on an optical medium, the optical storage system comprising:

an optical head configured to split a light beam into a main beam and at least one side beam; and a controller configured to:

modulate the main beam according to a writing strategy waveform that defines at least n writing pulses rising to a writing power level to write an nT mark to an optical medium;

process a first signal resulting from the at least one side beam being reflected from the optical medium;

process a second signal indicative of the writing strategy waveform to remove noise from the first signal caused by the main beam;

filter the first signal and the second signal to remove frequency content therefrom greater than a threshold to obtain, respectively, a first filtered signal and a second filtered signal;

generate output indicative of the data directly after writing by dividing the first filtered signal by the second filtered signal.

6. The optical storage system of claim 1, wherein the optical medium is an optical tape.

7. An optical storage system for performing direct read after write on an optical medium, the optical storage system comprising:

an optical head configured to split a light beam into a main beam and at least one side beam; and a controller configured to:

modulate the main beam according to a writing strategy waveform that defines at least n writing pulses rising to a writing power level to write an nT mark to an optical medium, wherein the writing strategy waveform is such that widths of at least some of the writing pulses are different and wherein the writing strategy waveform is such that a width of a final writing pulse is shorter than a width of an immediately prior writing pulse;

process a first signal resulting from the at least one side beam being reflected from the optical medium, including altering a direct current bias of the first signal, process a second signal indicative of the writing strategy waveform to remove noise from the first signal caused by the main beam, and generate output indicative of the data directly after writing by dividing the first signal by the second signal.

8. An optical storage system for performing direct read after write on an optical medium, the optical storage system comprising:

an optical head configured to split a light beam into a main beam and at least one side beam; and a controller configured to:

modulate the main beam according to a writing strategy waveform that defines at least n writing pulses rising to a writing power level to write an nT mark to an optical medium, wherein the writing strategy waveform is such that widths of at least some of the writing pulses are different and wherein the writing strategy waveform is such that a width of a final writing pulse is shorter than a width of an immediately prior writing pulse;

process a first signal resulting from the at least one side beam being reflected from the optical medium;

process a second signal indicative of the writing strategy waveform to remove noise from the first signal caused by the main beam, filter the first signal and the second signal to remove frequency content therefrom greater than a threshold to obtain, respectively, a first filtered signal and a second filtered signal;

generate output indicative of the data directly after writing by dividing the first filtered signal by the second filtered signal.

9. The optical storage system of claim 7, wherein the writing strategy waveform further comprises the laser power level being set to a level lower than the cooling power level subsequent to a final pulse.

10. The optical storage system of claim 7, wherein the optical medium is an optical tape.

11. The optical storage system of claim 7, wherein the writing strategy waveform is such that a frequency of the at least n writing pulses is at least twice a frequency of the first signal.

12. The optical storage system of claim 7, wherein the writing strategy waveform defines 2n−1 writing pulses for every n bits of data to be written to an optical medium.

13. An optical storage system for performing direct read after write on an optical medium, the optical storage system comprising:

an optical head configured to split a light beam into a main beam and at least one side beam; and a controller configured to:

modulate the main beam according to a writing strategy waveform that defines at least n writing pulses rising to a writing power level to write an nT mark to an optical medium, wherein the writing strategy waveform is such that widths of at least some of the pulses are different and wherein the writing strategy waveform is such that a width of an initial writing pulse is shorter than a width of an immediately subsequent writing pulse;

process a first signal resulting from the at least one side beam being reflected from the optical medium, including altering a direct current bias of the first signal;

process a second signal indicative of the writing strategy waveform to remove noise from the first signal caused by the main beam, and generate output indicative of the data directly after writing by dividing the first signal by the second signal.

14. An optical storage system for performing direct read after write on an optical medium, the optical storage system comprising:

an optical head configured to split a light beam into a main beam and at least one side beam; and a controller configured to:

modulate the main beam according to a writing strategy waveform that defines at least n writing pulses rising to a writing power level to write an nT mark to an optical medium, wherein the writing strategy waveform is such that widths of at least some of the pulses are different and wherein the writing strategy waveform is such that a width of an initial writing pulse is shorter than a width of an immediately subsequent writing pulse;

process a first signal resulting from the at least one side beam being reflected from the optical medium;

process a second signal indicative of the writing strategy waveform to remove noise from the first signal caused by the main beam, filter the first signal and the second signal to remove frequency content therefrom greater than a threshold to obtain, respectively, a first filtered signal and a second filtered signal;

generate output indicative of the data directly after writing by dividing the first filtered signal by the second filtered signal.

15. The optical storage system of claim 13, wherein the writing strategy waveform further comprises the laser power level being set to a level lower than the cooling power level subsequent to a final pulse.

16. The optical storage system of claim 13, wherein the writing strategy waveform is such that a frequency of the pulses is at least twice a frequency of the first signal.

17. The optical storage system of claim 13, wherein the optical medium is an optical tape.

* * * * *